US012643616B2

(12) United States Patent
Hemphill et al.

(10) Patent No.: US 12,643,616 B2
(45) Date of Patent: Jun. 2, 2026

(54) MOTOR VEHICLE HINGE SYSTEMS INCLUDING DUAL ARTICULATION GOOSENECK HINGES

(71) Applicant: FORD GLOBAL TECHNOLOGIES, LLC, Dearborn, MI (US)

(72) Inventors: Joshua Robert Hemphill, White Lake, MI (US); Joe Prior, Detroit, MI (US); Raul Ezequiel Alvarez Ruiz, Estado de Mexico (MX); Michael Shawn Watterworth, Brighton, MI (US); Samuel Jacob McCormick, South Lyon, MI (US); Christopher R. Kutz, Tecumseh, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 460 days.

(21) Appl. No.: 18/322,095

(22) Filed: May 23, 2023

(65) Prior Publication Data
US 2024/0391536 A1      Nov. 28, 2024

(51) Int. Cl.
| | |
|---|---|
| B62D 33/027 | (2006.01) |
| E05D 3/12 | (2006.01) |
| E05D 5/06 | (2006.01) |
| E05D 11/00 | (2006.01) |

(52) U.S. Cl.
CPC ....... B62D 33/027 (2013.01); B62D 33/0273 (2013.01); E05D 3/127 (2013.01); E05D 2005/067 (2013.01); E05D 2011/009 (2013.01)

(58) Field of Classification Search
CPC .. E05D 7/00; E05D 3/06; E05D 5/062; E05D 5/06; E05D 11/1057; E05D 2005/067; E05D 2011/009; E05D 3/127; E05Y 2900/516; E05Y 2900/546; E05Y 2900/544; B62D 33/0273; B62D 33/03; B62D 33/037; B62D 33/027
USPC .............. 296/50, 51, 146.11, 146.12; 16/366
See application file for complete search history.

(56) References Cited

U.S. PATENT DOCUMENTS

| | | | |
|---|---|---|---|
| 6,196,619 B1 | 3/2001 | Townsend et al. | |
| 6,419,305 B1 | 7/2002 | Larsen | |
| 6,712,418 B1 | 3/2004 | Lathers | |
| 7,032,953 B2 * | 4/2006 | Rangnekar ............ | E05F 1/1033 |
| | | | 16/366 |
| 8,007,026 B2 | 8/2011 | Scott et al. | |

(Continued)

FOREIGN PATENT DOCUMENTS

| | | |
|---|---|---|
| CN | 214930140 U | 11/2021 |
| CN | 115162884 A | 10/2022 |

*Primary Examiner* — Amy R Weisberg
*Assistant Examiner* — Denise Lynne Esquivel
(74) *Attorney, Agent, or Firm* — Vichit Chea; Carlson, Gaskey & Olds, P.C.

(57) ABSTRACT

Hinge systems are provided for movably mounting a door subassembly to a tailgate assembly of a motor vehicle. An exemplary hinge system may include an upper hinge assembly and a lower hinge assembly. Each hinge assembly may include a gooseneck bracket that establishes a load path through the respective hinge assembly. The load path through the upper hinge assembly may be configured differently than the load path through the lower hinge assembly. The gooseneck brackets may be reinforced along the load paths in order to transfer stress loads through the stiffest portions of the gooseneck brackets during door loading events.

20 Claims, 6 Drawing Sheets

(56)         References Cited

U.S. PATENT DOCUMENTS

| | | | |
|---|---|---|---|
| 9,562,382 | B2 | 2/2017 | Dey |
| 9,777,522 | B2 * | 10/2017 | Dey .................... E05D 11/1014 |
| 10,422,170 | B2 | 9/2019 | Trentin et al. |
| 10,968,671 | B2 | 4/2021 | Dey et al. |
| 11,643,151 | B2 * | 5/2023 | Nania ................ B62D 33/0273 |
| | | | 296/51 |
| 2003/0189357 | A1 | 10/2003 | Patberg et al. |
| 2009/0072582 | A1 | 3/2009 | Elliott et al. |
| 2009/0178241 | A1 * | 7/2009 | Fain ........................ E05D 11/06 |
| | | | 16/334 |
| 2009/0250577 | A1 | 10/2009 | Townson |
| 2011/0156437 | A1 | 6/2011 | Kishino |
| 2015/0252602 | A1 * | 9/2015 | Nielsen ................... E05D 11/06 |
| | | | 16/275 |
| 2019/0003223 | A1 * | 1/2019 | Page ....................... E05D 5/062 |
| 2019/0283813 | A1 | 9/2019 | Smith et al. |
| 2019/0308494 | A1 | 10/2019 | Aubrey et al. |
| 2022/0219516 | A1 | 7/2022 | Schmeichel et al. |

* cited by examiner

MOTOR VEHICLE HINGE SYSTEMS INCLUDING DUAL ARTICULATION GOOSENECK HINGES

TECHNICAL FIELD

This disclosure relates generally to motor vehicles, and more particularly to hinge systems for movably supporting a door subassembly relative to a tailgate assembly of a motor vehicle.

BACKGROUND

Many motor vehicles include cargo spaces for transporting various types of cargo. A pickup truck, for example, includes a cargo bed that establishes the cargo space of the truck. A tailgate typically encloses one end of the cargo bed. The tailgate is movable between closed and open positions for accessing the cargo bed.

SUMMARY

A vehicle tailgate assembly according to an exemplary aspect of the present disclosure includes, among other things, a frame subassembly, a door subassembly, and a hinge system configured to movably support the door subassembly relative to the frame subassembly. The hinge system includes a first hinge assembly that establishes a first load path, and a second hinge assembly that establishes a second load path that is configured differently than the first load path.

In a further non-limiting embodiment of the forgoing vehicle tailgate assembly, the first hinge assembly includes a three-piece dual pivot design that includes a door-side bracket for mounting to the door subassembly, a body-side bracket for mounting to the frame subassembly, and a gooseneck bracket that interconnects the door-side bracket and the body-side bracket.

In a further non-limiting embodiment of either of the foregoing vehicle tailgate assemblies, the first load path extends through a reinforcing section of the gooseneck bracket.

In a further non-limiting embodiment of any of the foregoing vehicle tailgate assemblies, the reinforcing section is established by a thickened section of the gooseneck bracket.

In a further non-limiting embodiment of any of the foregoing vehicle tailgate assemblies, the second hinge assembly includes a three-piece dual pivot design that includes a door-side bracket for mounting to the door subassembly, a body-side bracket for mounting to the frame subassembly, and a gooseneck bracket that interconnects the door-side bracket and the body-side bracket.

In a further non-limiting embodiment of any of the foregoing vehicle tailgate assemblies, the second load path extends through a reinforcing section of the gooseneck bracket.

In a further non-limiting embodiment of any of the foregoing vehicle tailgate assemblies, the reinforcing section is established by a thickened section of the gooseneck bracket.

In a further non-limiting embodiment of any of the foregoing vehicle tailgate assemblies, a linkage bar interconnects the first hinge assembly and the second hinge assembly.

In a further non-limiting embodiment of any of the foregoing vehicle tailgate assemblies, the first load path extends through a first location of a first gooseneck bracket of the first hinge assembly, and the second load path extends through a second location of a second gooseneck bracket of the second hinge assembly.

In a further non-limiting embodiment of any of the foregoing vehicle tailgate assemblies, the first location is through an upper portion of the first gooseneck bracket, and the second location is through a lower portion of the second gooseneck bracket.

In a further non-limiting embodiment of any of the foregoing vehicle tailgate assemblies, a first reinforcing section is provided on the upper portion of the first gooseneck bracket at the first location, and a second reinforcing section is provided on the lower portion of the second gooseneck bracket at the second location.

In a further non-limiting embodiment of any of the foregoing vehicle tailgate assemblies, the first reinforcing section includes a different design configuration compared to the second reinforcing section.

In a further non-limiting embodiment of any of the foregoing vehicle tailgate assemblies, the first reinforcing section extends along an arcuate path between a first barrel mount and a second barrel mount of the first gooseneck bracket, and the second reinforcing section extends along an arcuate path between a first barrel mount and a second barrel mount of the second gooseneck bracket.

In a further non-limiting embodiment of any of the foregoing vehicle tailgate assemblies, the first gooseneck bracket is connected to a door-side bracket of the first hinge assembly by a first pivot pin and to a body-side bracket of the first hinge assembly by a second pivot pin.

In a further non-limiting embodiment of any of the foregoing vehicle tailgate assemblies, the second gooseneck bracket is connected to a door-side bracket of the second hinge assembly by a first pivot pin and to a body-side bracket of the second hinge assembly by a second pivot pin.

A motor vehicle according to another exemplary aspect of the present disclosure includes, among other things, a cargo bed including a tailgate assembly having a frame subassembly, a door subassembly, and a hinge system configured to movably support the door subassembly relative to the frame subassembly. An upper hinge assembly of the hinge system includes a first gooseneck bracket having a first reinforcing section that establishes a first load path of the hinge system. A lower hinge assembly of the hinge system includes a second gooseneck bracket having a second reinforcing section that establishes a second load path of the hinge system.

In a further non-limiting embodiment of the foregoing motor vehicle, the first load path extends through an upper portion of a curved body of the first gooseneck bracket, and the second load path extends through a lower portion of a curved body of the second gooseneck bracket.

In a further non-limiting embodiment of either of the foregoing motor vehicles, the first reinforcing section is established by a first thickened section of the first gooseneck bracket, and the second reinforcing section is established by a second thickened section of the second gooseneck bracket.

In a further non-limiting embodiment of any of the foregoing motor vehicles, a linkage bar interconnects the upper hinge assembly and the lower hinge assembly.

In a further non-limiting embodiment of any of the foregoing motor vehicles, the linkage bar is accommodated within a first housing provided on the first gooseneck bracket of the upper hinge assembly and a second housing provided on the second gooseneck bracket of the lower hinge assembly.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

Figure 1:
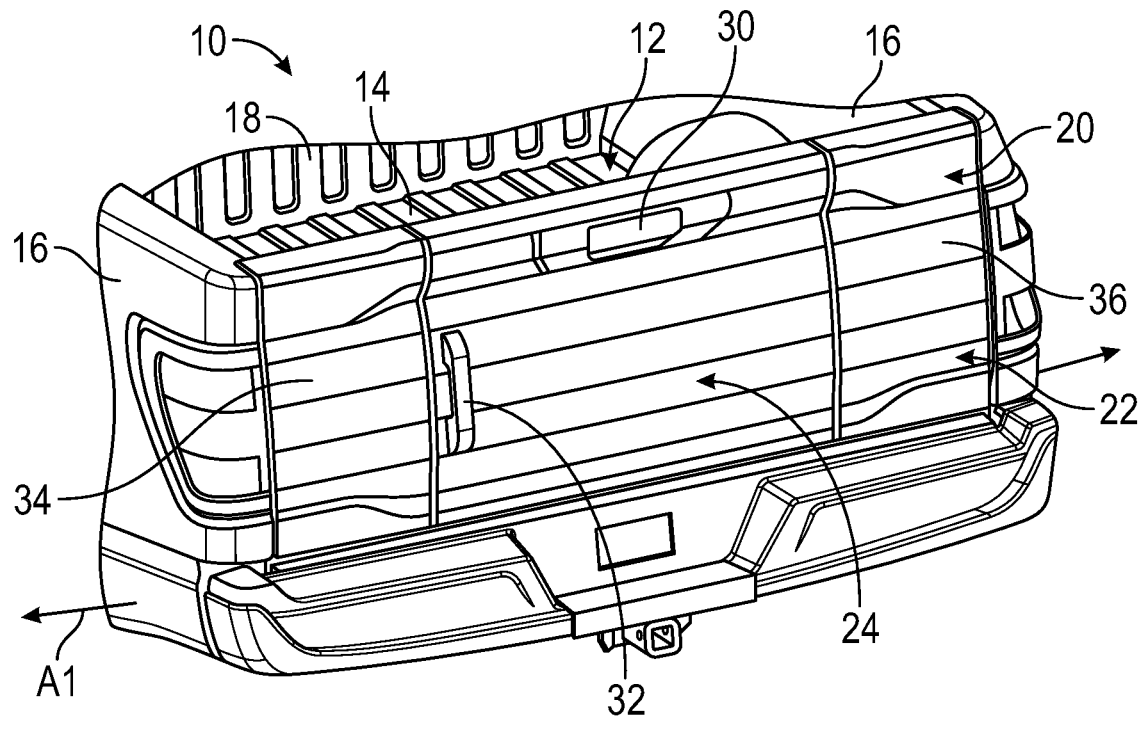
FIG. 1 is a rear perspective view of a motor vehicle equipped with a cargo space and a tailgate assembly positioned in a tailgate closed position relative to the cargo space.

This disclosure details hinge systems for movably mounting a door subassembly to a tailgate assembly of a motor vehicle. An exemplary hinge system may include an upper hinge assembly and a lower hinge assembly. Each hinge assembly may include a gooseneck bracket that establishes a load path through the respective hinge assembly. The load path through the upper hinge assembly may be configured differently than the load path through the lower hinge assembly. The gooseneck brackets may be reinforced along the load paths in order to transfer stress loads through the stiffest portions of the gooseneck brackets during door loading events. These and other features of this disclosure are described in greater detail below.

FIGS. 1, 2, 3, and 4 illustrate select portions of a motor vehicle 10 that includes a cargo space for storing and/or hauling one or more items of cargo. In the illustrated embodiment, the vehicle 10 is a pickup truck and the cargo space is established by a cargo bed 12 of the pickup truck. While a pickup truck with a cargo bed is specifically depicted and referenced herein, other vehicles having other types of cargo spaces could also benefit from the teachings of this disclosure. The vehicle 10 could also be a conventional, internal combustion engine powered vehicle, a traction battery powered electric or hybrid vehicle, an autonomous vehicle (i.e., a driverless vehicle), etc.

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily drawn to scale, and some features may be exaggerated or minimized to emphasize certain details of a particular component, assembly, or system.

The cargo bed 12 is generally rearward of a passenger cabin (not shown) of the vehicle 10 and includes a floor 14 extending between a pair of longitudinally extending side walls 16, a laterally extending front wall 18, and a tailgate assembly 20. The overall size, shape, and configuration of the cargo bed 12 are not intended to limit this disclosure.

The tailgate assembly 20 may be configured as a multi-sectional tailgate structure. For example, the tailgate assembly 20 may include, among other things, a frame subassembly 22 and a door subassembly 24. The door subassembly 24 may sometimes be referred to as a "swing gate subassembly."

The frame subassembly 22 may include a driver side section 34, a passenger side section 36, and a connection member 38 (see FIG. 3) connected between the driver side section 34 and the passenger side section 36. The door subassembly 24 may be movably connected to either the driver side section 34 or the passenger side section 36 of the frame subassembly 22 by a hinge system 40 (schematically shown in FIG. 3).

Figure 2:
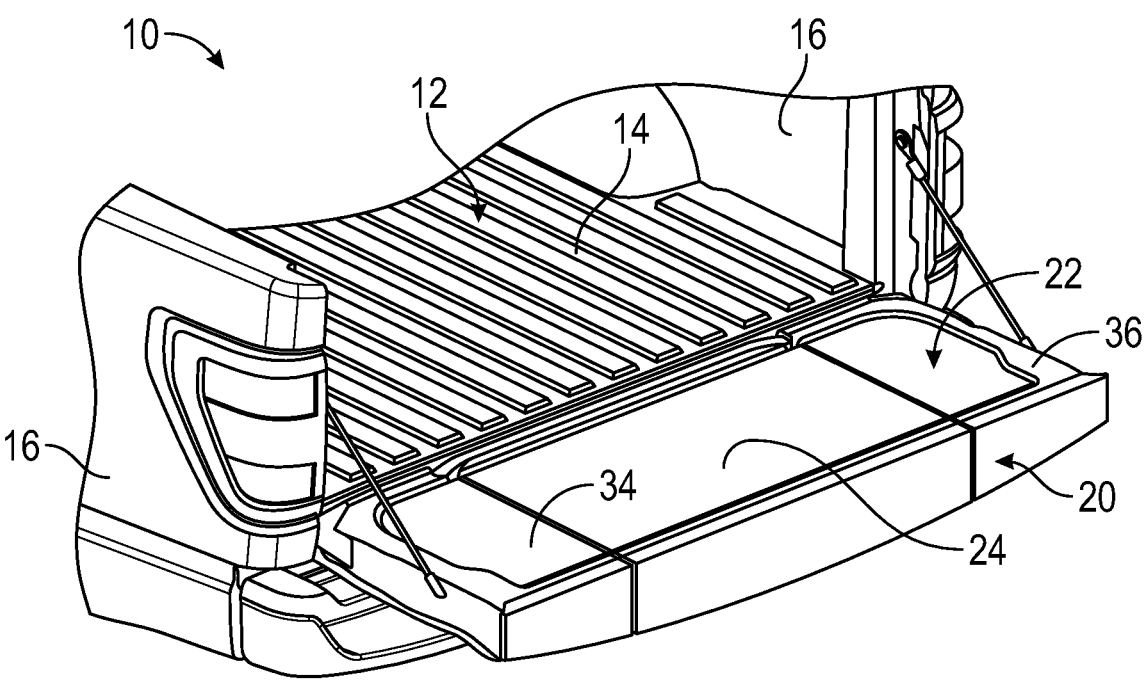
FIG. 2 illustrates the tailgate assembly of FIG. 1 in a tailgate open position.

The tailgate assembly 20 is pivotable about a first axis A1 relative to the cargo bed 12 between a tailgate closed position shown in FIG. 1 and a tailgate open position shown in FIG. 2. The tailgate assembly 20 may be moved from the tailgate closed position to the tailgate open position in response to actuating a first handle 30 of the tailgate assembly 20, for example. The tailgate assembly 20 is vertically aligned when in the tailgate closed position and thus generally encloses an end of the cargo bed 12 that is opposite from the front wall 18, and the tailgate assembly 20 is horizontally aligned when in the tailgate open position and thus generally allows access to the cargo bed 12. Vertical and horizontal, for purposes of this disclosure, are with reference to ground in the ordinary orientation of the vehicle 10 during operation.

The door subassembly 24 of the tailgate assembly 20 is in a door closed position and is latched to the frame subassembly 22 when the frame subassembly 22 and the door subassembly 24 are pivoted between the tailgate closed position and the tailgate open position. Thus, the frame subassembly 22 and the door subassembly 24 pivot together as a unit when the tailgate assembly 20 is transitioned back and forth between the tailgate closed position and the tailgate open position.

Figure 3:
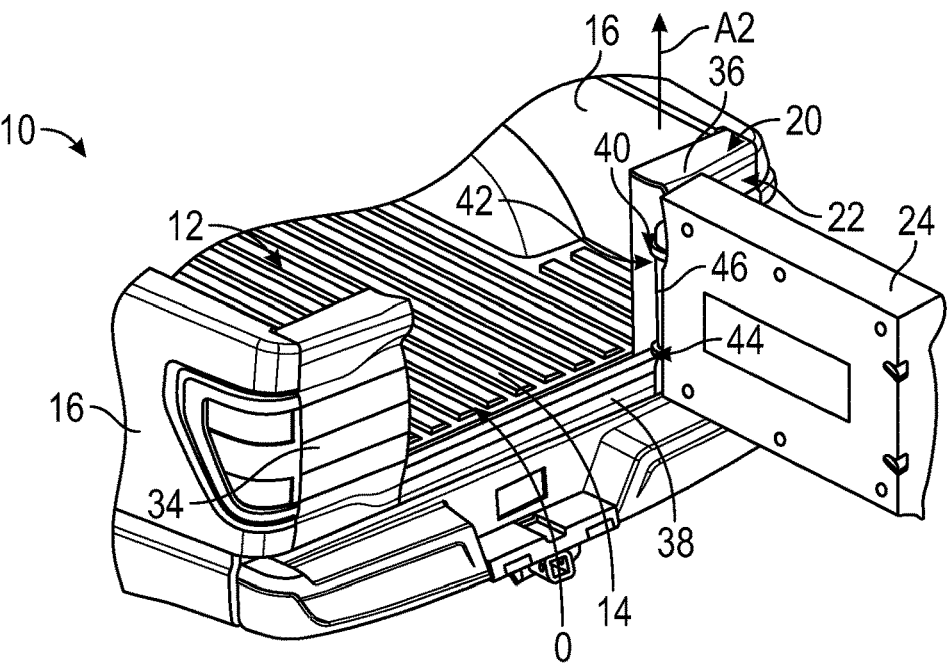
FIG. 3 illustrates a door subassembly of the tailgate assembly of FIG. 1 in a door open position.
Figure 4:
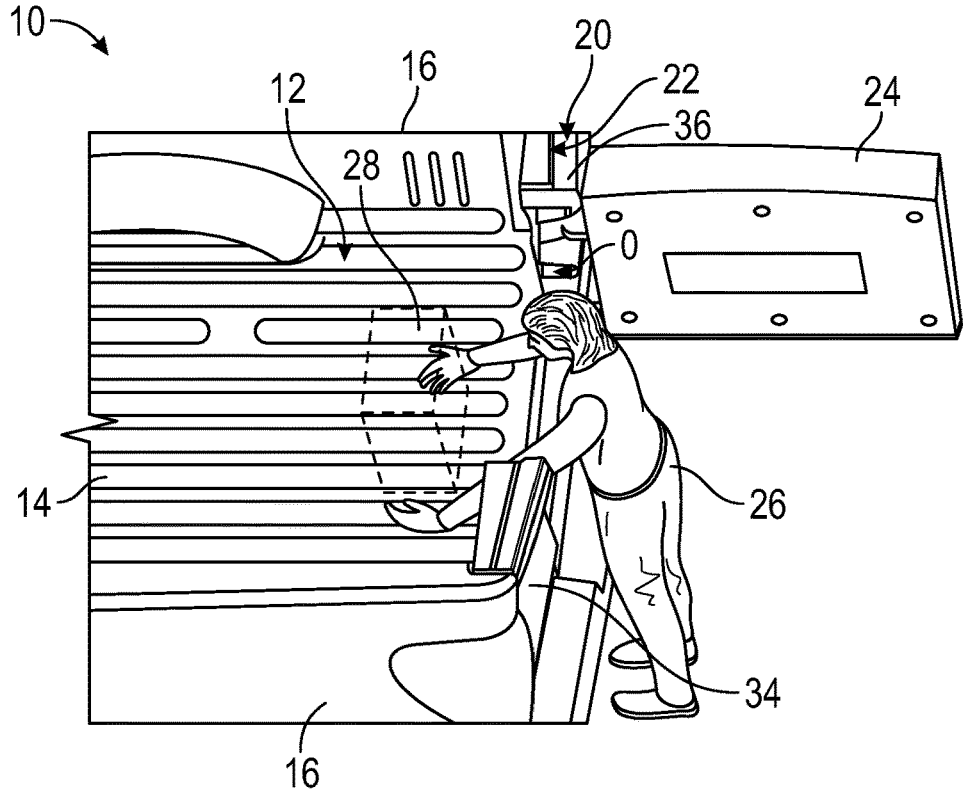
FIG. 4 is a rear and top view of the tailgate assembly and the door subassembly of FIG. 3.

When in the tailgate closed position, the door subassembly 24 may be pivotable relative to the frame subassembly 22 about a second axis A2 between the door closed position shown in FIG. 1 and a door open position shown in FIG. 3. In an embodiment, the first axis A1 is a horizontally extending axis, and the second axis A2 is transverse to the first axis A1 and is thus considered a vertically extending axis. The door subassembly 24 may optionally include a second handle 32 (see FIG. 1). The door subassembly 24 may be moved between the door closed position and the door open position by grasping the second handle 32, for example.

The door subassembly 24 provides a cargo bed access opening O when moved to the door open position. In an embodiment, the cargo bed access opening O extends vertically downward at least as far as the floor 14 of the cargo bed 12. A user 26 (see FIG. 4) can access the cargo bed 12 through the cargo bed access opening O when the door subassembly 24 in positioned in the door open position. Placing the door subassembly 24 in the door open position allows the user 26 to move closer to the cargo bed 12 than, for example, if the tailgate assembly 20 were moved to the tailgate open position of FIG. 2. The cargo bed access opening O can also provide clearance for the user 26 to enter the cargo bed 12 to either load or retrieve an item of cargo 28 (see FIG. 4) without moving the tailgate assembly 20 to the tailgate open position.

The hinge system 40 may be configured to meet certain design requirements of the tailgate assembly 20. For example, in an effort to satisfy customer expectations for structural integrity and durability, it may be desirable for the hinge system 40 to be equipped to substantially limit sag and oscillation of the door subassembly 24 as the door subassembly 24 is moved between the door closed position and the door open position. This disclosure is therefore directed to tailgate hinge systems that enable maximum usability and ease of manufacturing of the tailgate assembly 20 while enhancing the structural performance and durability of the door subassembly 24.

Figure 5:
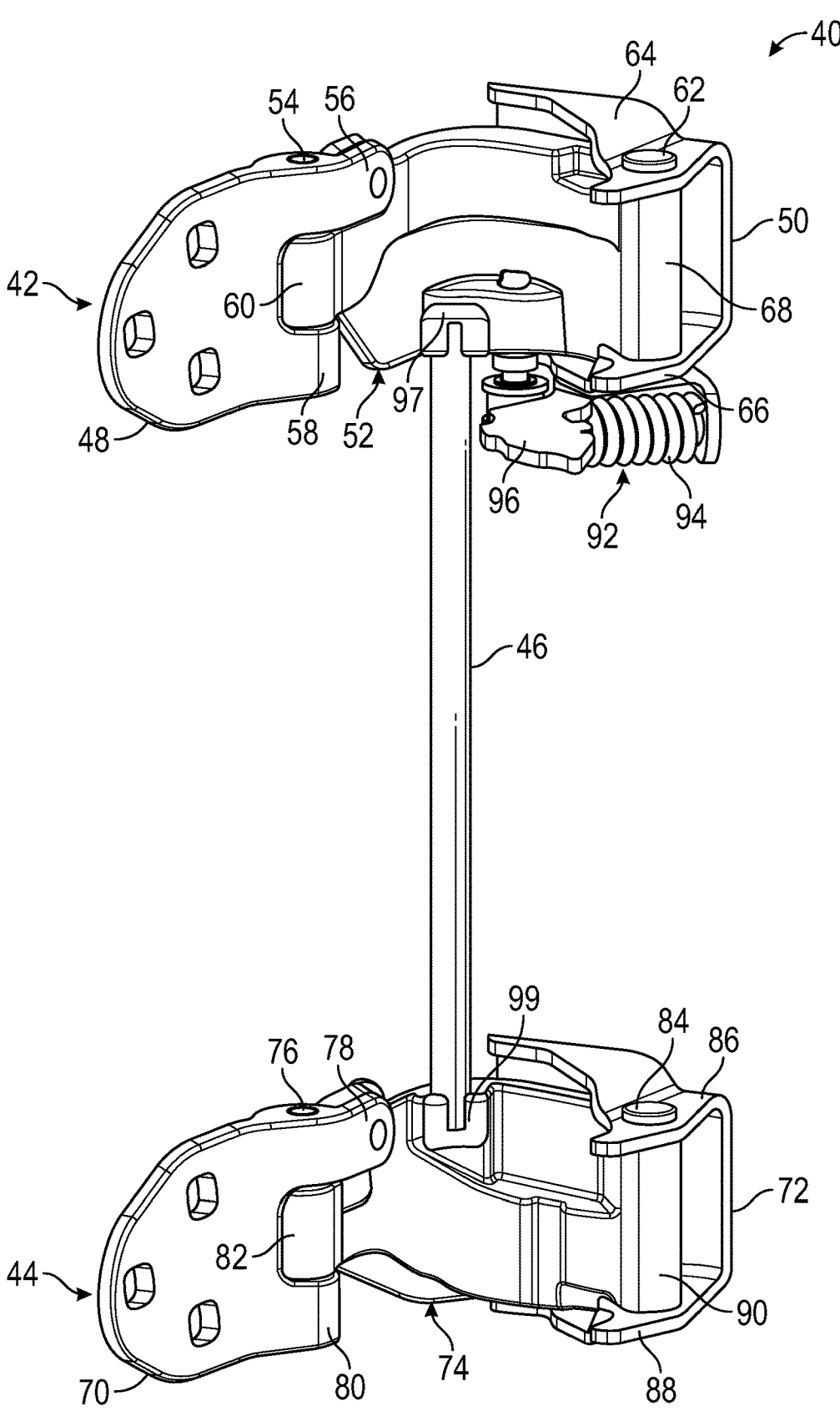
FIG. 5 is a perspective view of a hinge system for mounting a door subassembly to a tailgate assembly of a motor vehicle.
Figure 6:
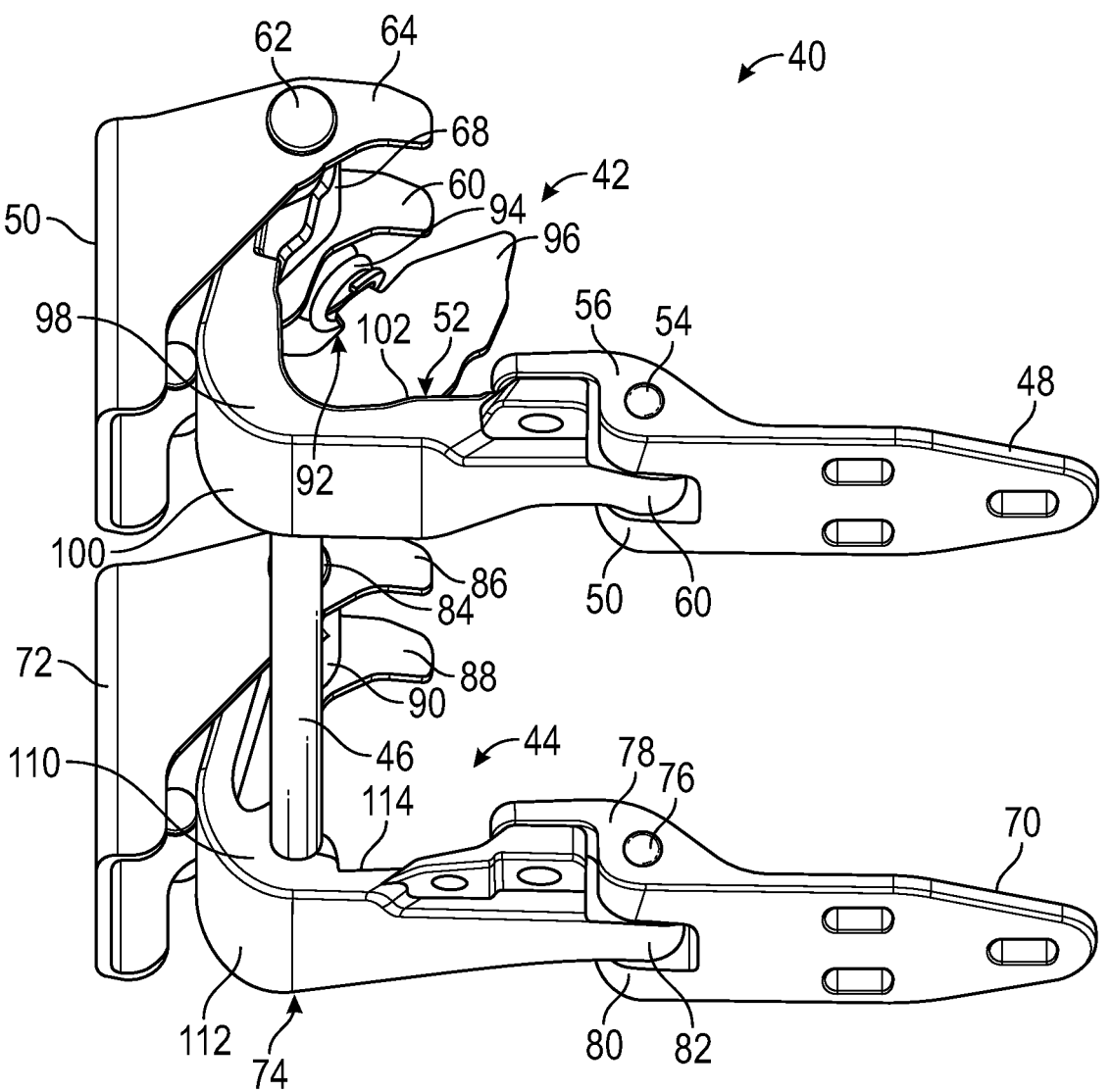
FIG. 6 is another perspective view of the hinge system of FIG. 5.

FIGS. 5 and 6 illustrate an exemplary hinge system 40 that can be utilized on a motor vehicle, such as the vehicle 10 of FIGS. 1-4, for example. The hinge system 40 may be configured for mounting to the door subassembly 24 to the frame subassembly 22 of the tailgate assembly 20 and for enabling movement of the door subassembly 24 between the door closed position and the door open position. The hinge system 40 may be further configured to enable the door subassembly 24 to be pivoted into multiple angular positions relative to the frame subassembly 22. For simplicity, the door subassembly 24 and the frame subassembly 22 are not shown in FIGS. 5-6.

In an embodiment, the hinge system 40 is not visible when the door subassembly 24 is positioned in the door closed position. The hinge system 40 may therefore be considered a hidden hinge system.

The hinge system 40 may include a first or upper hinge assembly 42, a second or lower hinge assembly 44, and a linkage bar 46 that extends between the upper hinge assembly 42 and the lower hinge assembly 44. The linkage bar 46 may interconnect the upper and lower hinge assemblies 42, 44 for limiting oscillations as the door subassembly 24 is moved between the door closed position and the door open position, thereby facilitating a more uniform and pleasing opening and closing sequence of the door subassembly 24. The linkage bar 46 may be fixedly secured (e.g., welded) to each of the upper hinge assembly 42 and the lower hinge assembly 44.

The upper hinge assembly 42 may embody a three-piece dual pivot design that includes a door-side bracket 48, a body-side bracket 50, and a gooseneck bracket 52 that interconnects the door-side bracket 48 and the body-side bracket 50. The door-side bracket 48 may be mounted to the door subassembly 24 by a first plurality of fasteners (not shown), and the body-side bracket 50 may be mounted to the frame subassembly 22 (e.g., either to the driver side section 34 or the passenger side section 36) by a second plurality of fasteners (not shown).

The door-side bracket 48 may be pivotably connected to the gooseneck bracket 52 by a first pivot pin 54. The first pivot pin 54 may extend through openings provided by a first arm 56 of the door-side bracket 48, a first barrel mount 60 of the gooseneck bracket 52, and a second arm 58 of the door-side bracket 48.

The body-side bracket 50 may be pivotably connected to the gooseneck bracket 52 by a second pivot pin 62. The second pivot pin 62 may extend through openings provided by a first arm 64 of the body-side bracket 50, a second barrel mount 68 of the gooseneck bracket 52, and a second arm 66 of the door-side bracket 48.

The lower hinge assembly 44 may likewise embody a three-piece dual pivot design that includes a door-side bracket 70, a body-side bracket 72, and a gooseneck bracket 74 that interconnects the door-side bracket 70 and the body-side bracket 72. The door-side bracket 70 may be mounted to the door subassembly 24 by a first plurality of fasteners (not shown), and the body-side bracket 72 may be mounted to the frame subassembly 22 (e.g., either to the driver side section 34 or the passenger side section 36) by a second plurality of fasteners (not shown).

In an embodiment, the door-side bracket 70 is identical in design to the door-side bracket 48 of the upper hinge assembly 42, and the body-side bracket 72 is identical in design to the body-side bracket 50 of the upper hinge assembly 42. The upper and lower hinge assemblies 42, 44 may therefore include common parts. However, as further discussed below, the gooseneck bracket 74 of the lower hinge assembly 44 may include a design that is distinct from the gooseneck bracket 52 of the upper hinge assembly 42.

The door-side bracket 70 may be pivotably connected to the gooseneck bracket 74 by a first pivot pin 76. The first pivot pin 76 may extend through openings provided by a first arm 78 of the door-side bracket 70, a first barrel mount 82 of the gooseneck bracket 74, and a second arm 80 of the door-side bracket 70.

The body-side bracket 72 may be pivotably connected to the gooseneck bracket 74 by a second pivot pin 84. The second pivot pin 84 may extend through openings provided by a first arm 86 of the body-side bracket 72, a second barrel mount 90 of the gooseneck bracket 74, and a second arm 88 of the body-side bracket 72.

Figure 7:
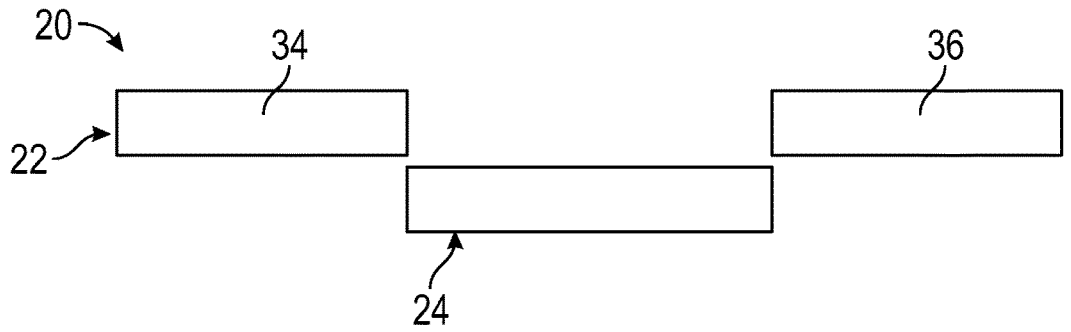
FIG. 7 illustrates an exemplary positioning of a door subassembly relative to a frame subassembly of a tailgate assembly of a motor vehicle.

The upper hinge assembly 42 may be pivoted about the first pivot pin 54 and the second pivot pin 62 and the lower hinge assembly 44 may be pivoted about the first pivot pin 76 and the second pivot pin 84 for positioning the door subassembly 24 at various angular positions relative to the frame subassembly 22. In a particular implementation, the door subassembly 24 may be moved to a position that is both rearwardly offset from and parallel to both the driver side section 34 and the passenger side section 36 of the frame subassembly 22 (see exemplary position shown in FIG. 7). Positioning the door subassembly 24 in such a position facilitates a simpler and more streamlined painting process that eliminates the need to paint the door subassembly 24 while removed from the frame subassembly 22 during manufacturing.

The upper hinge assembly 42 may additionally include a tension spring assembly 92. The tension spring assembly 92 may be configured to bias the door subassembly 24 toward the door closed position until the door subassembly is opened a predefined amount. The tension spring assembly 92 may include a biasing member 94 (e.g., a torsion spring) and a detent arm 96.

As stated above, the linkage bar 46 may be fixedly secured at both the upper hinge assembly 42 and the lower hinge assembly 44. In an embodiment, the linkage bar 46 is accommodated within each of a first housing 97 provided on the gooseneck bracket 52 of the upper hinge assembly 42 and a second housing 99 provided on the gooseneck bracket 74 of the lower hinge assembly 44.

Figure 8:
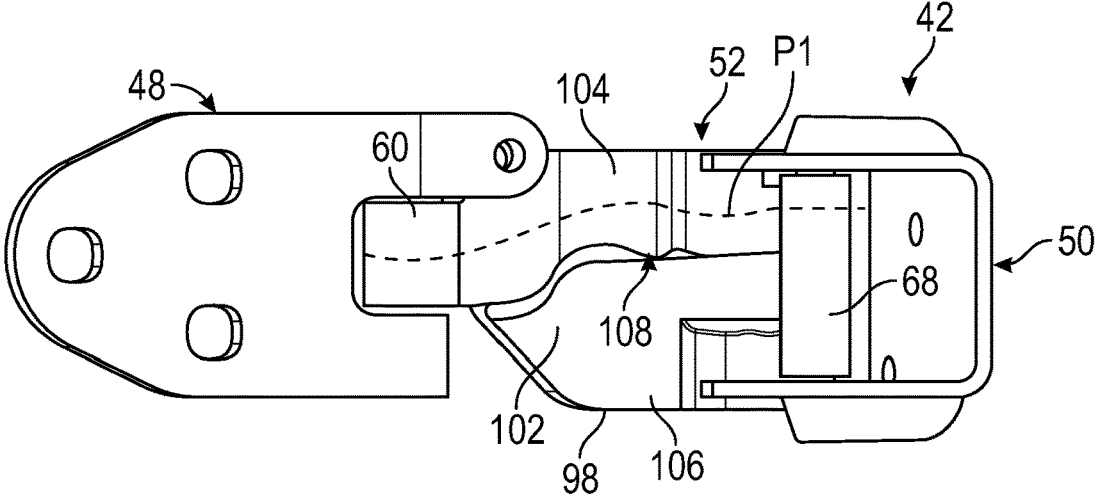
FIG. 8 illustrates a first or upper hinge assembly of the hinge system of FIGS. 5-6.

Referring now primarily to FIGS. 5, 6, and 8, the gooseneck bracket 52 of the upper hinge assembly 42 may include a curved body 98 that extends along an arcuate path between the first barrel mount 60 and the second barrel mount 68. The curved design of the gooseneck bracket 52 is configured to allow the door subassembly 24 to be angularly displaced from the frame subassembly 22 by about 1000 when moved to the door open position. In this disclosure, the term "about" means that the expressed quantities or ranges need not be exact but may be approximated and/or larger or smaller, reflecting acceptable tolerances, conversion factors, measurement error, etc.

The curved body 98 includes an inner side 100 and an outer side 102. When mounted on the vehicle 10, the inner side 100 faces forward toward the cargo bed 12, and the outer side 102 faces rearward in a direction away from the cargo bed 12.

The inner side 100 of the curved body 98 of the gooseneck bracket 52 may include a relatively smooth arcuate profile. In an embodiment, the inner side 100 is substantially uninterrupted along its arcuate surface.

The outer side 102 of the curved body 98 may include an upper portion 104 and a lower portion 106. A first load path P1 of the gooseneck bracket 52 may extend through the upper portion 104. The location of the first load path P1 may be identified using computer-aided engineering (CAE) software, for example. The first load path P1 is a representation of the manner in which stress loads will be transferred across the gooseneck bracket 52 (e.g., in a direction from the door-side bracket 48 to the body-side bracket 50) as the upper hinge assembly 42 is loaded (e.g., by flexion and torsion stresses that originate at the door subassembly 24 during use).

A reinforcing section 108 may be provided on the upper portion 104 of the gooseneck bracket 52 at the location of the first load path P1. In an embodiment, the reinforcing section 108 is established by a thickened section of the gooseneck bracket 52. For example, the gooseneck bracket 52 may include a greater thickness at the reinforcing section 108 compared to the lower portion 106, which generally does not include any thickened or reinforced sections. In general, the reinforcing section 108 increases the stiffness of the gooseneck bracket 52 along the first load path P1, thereby optimizing performance of the hinge system 40 during loading events by ensuring that the stress loads are transferred through the stiffest portion of the gooseneck bracket 52.

Figure 9:
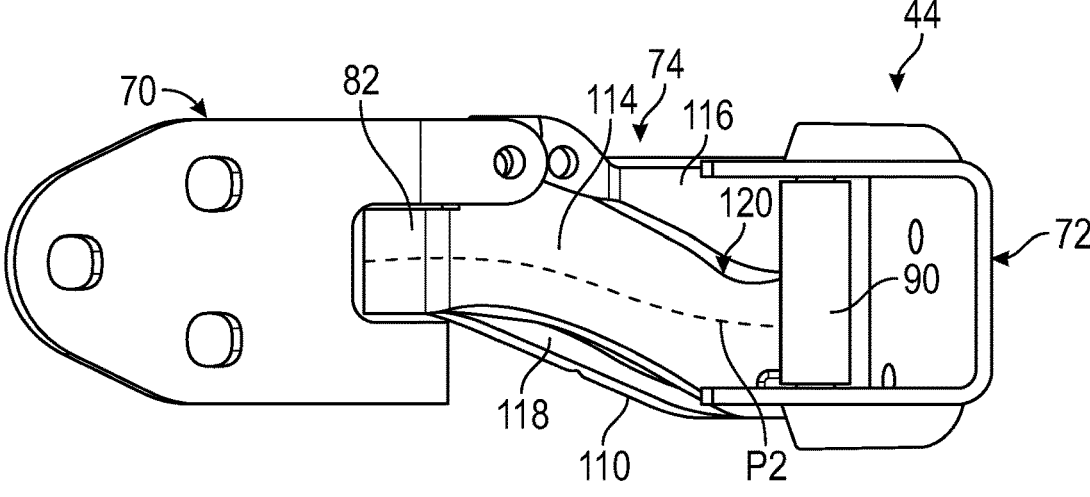
FIG. 9 illustrates a second or lower hinge assembly of the hinge system of FIGS. 5-6.

Referring now primarily to FIGS. 5, 6, and 9, the gooseneck bracket 74 of the lower hinge assembly 44 may include a curved body 110 that extends along an arcuate path between the first barrel mount 82 and the second barrel mount 90. The curved design of the gooseneck bracket 74 allows the door subassembly 24 to be angularly displaced from the frame subassembly 22 by about 1000 when moved to the door open position.

The curved body 110 includes an inner side 112 and an outer side 114. When mounted on the vehicle 10, the inner side 112 faces forward toward the cargo bed 12, and the outer side 114 faces rearward in a direction away from the cargo bed 12.

The inner side 112 of the curved body 110 of the gooseneck bracket 74 may include a relatively smooth arcuate profile. In an embodiment, the inner side 112 is substantially uninterrupted along its arcuate surface.

The outer side 114 of the curved body 110 may include an upper portion 116 and a lower portion 118. A second load path P2 of the gooseneck bracket 74 may extend through the lower portion 118. The second load path P2 may be a different load path that includes a different design than the first load path P1. The location of the second load path P2 may be identified using computer-aided engineering (CAE) software, for example. The second load path P2 is a representation of the manner in which stress loads will be transferred across the gooseneck bracket 74 (e.g., in a direction from the door-side bracket 70 to the body-side bracket 72) as the lower hinge assembly 44 is loaded (e.g., by flexion and torsion stresses that originate at the door subassembly 24 during use).

A reinforcing section 120 may be provided on the lower portion 118 of the gooseneck bracket 74 at the location of the second load path P2. In an embodiment, the reinforcing section 120 is established by a thickened section of the gooseneck bracket 74. For example, the gooseneck bracket 74 may include a greater thickness at the reinforcing section 120 compared to the upper portion 116, which generally does not include any thickened or reinforced sections. In general, the reinforcing section 120 increases the stiffness of the gooseneck bracket 74 along the second load path P2, thereby optimizing performance of the hinge system 40 during loading events by ensuring that the stress loads are transferred through the stiffest portion of the gooseneck bracket 74.

The reinforcing section 120 of the gooseneck bracket 74 may be configured differently than the reinforcing section 108 of the gooseneck bracket 52. The reinforcing section 120 may be configured differently than the reinforcing section 108 in terms of location, size, shape, thickness, material distribution, reinforcing pattern, etc.

Figure 10A:
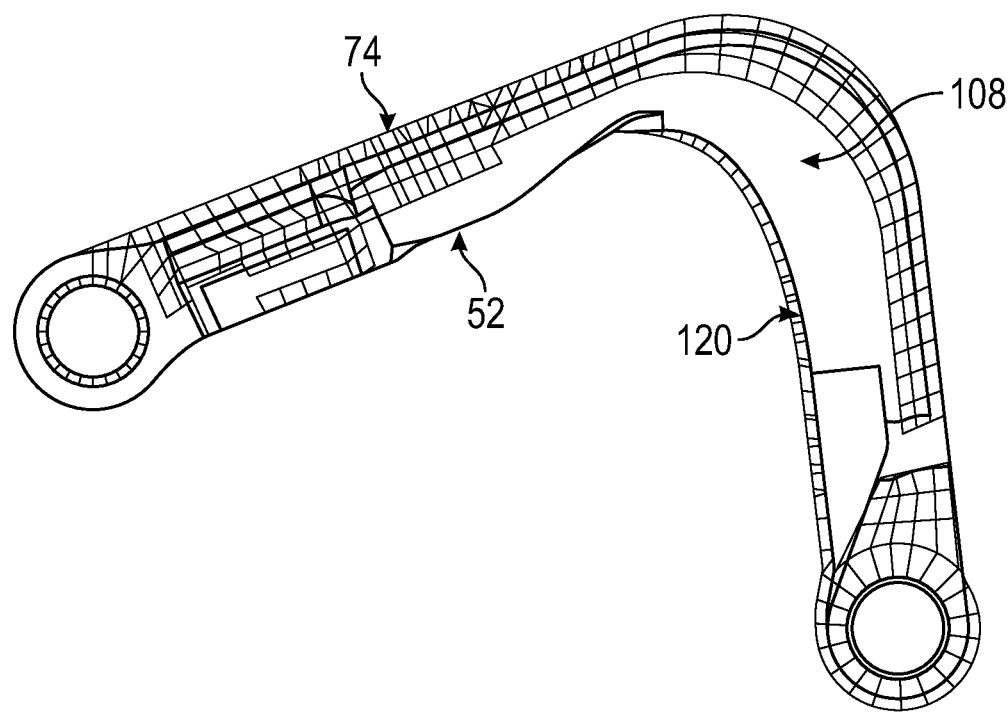
FIGS. 10A and 10B are overlay images between a lower hinge assembly gooseneck bracket and an upper hinge assembly gooseneck bracket.
Figure 10B:
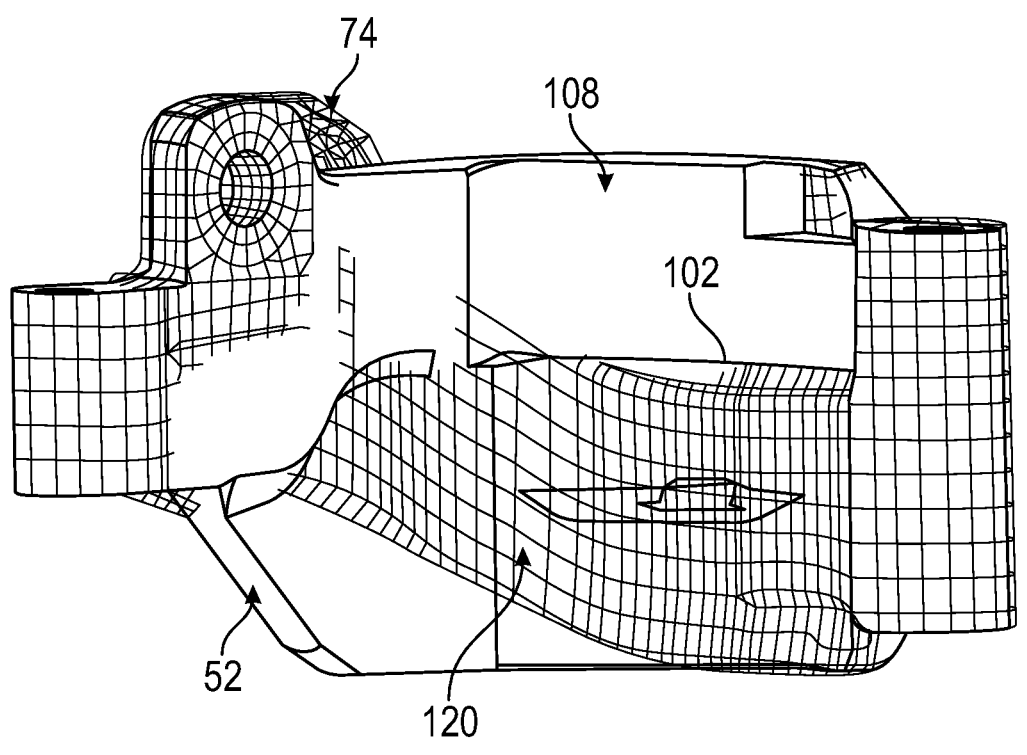

Exemplary design differences between the reinforcing section 120 of the gooseneck bracket 74 of the lower hinge assembly 44 and the reinforcing section 108 of the gooseneck bracket 52 of the upper hinge assembly 42 are further illustrated by the overlay views of FIGS. 10A and 10B. In these figures, the gooseneck bracket 74 is superimposed over the gooseneck bracket 52 and is indicated using grid lines. As can be appreciated from these overlay images, the distance the reinforcing section 120 extends from the outer side 114 is greater than the distance the reinforcing section 108 extends from the outer side 102. The reinforcing section 120 is thus considered to include a greater thickness compared to the reinforcing section 108 in this implementation. Moreover, a material distribution of the reinforcing section 120 may be different compared to a material distribution of the reinforcing section 108 as measured from a center plane of the respective brackets.

The design characteristics associated with the reinforcing section 120 of the gooseneck bracket 74 and the reinforcing section 108 of the gooseneck bracket 52 may be parametrized depending on various design criteria (e.g., door subassembly weight, center of gravity, etc.). The upper and lower hinge assemblies 42, 44 of the hinge system 40 may therefore be scalable for use with larger or smaller door subassemblies within the scope of this disclosure.

The hinge systems of this disclosure are equipped to substantially limit sag and oscillation during movement of tailgate door subassemblies. The proposed systems therefore satisfy customer expectations for structural integrity and durability while providing maximum usability and ease of manufacturing.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:
1. A vehicle tailgate assembly, comprising:
a frame subassembly;
a door subassembly; and
a hinge system configured to movably support the door subassembly relative to the frame subassembly, the hinge system including a first hinge assembly and a second hinge assembly,
wherein the first hinge assembly includes a first gooseneck bracket having a first reinforcing section established by a first thickened section of the first gooseneck bracket, the first reinforcing section establishing a first load path of the first hinge assembly,
wherein the second hinge assembly includes a second gooseneck bracket having a second reinforcing section established by a second thickened section of the second gooseneck bracket, the second reinforcing section establishing a second load path through the second hinge assembly.
2. The vehicle tailgate assembly as recited in claim 1, wherein the first hinge assembly includes a three-piece dual pivot design that includes a door-side bracket for mounting to the door subassembly, a body-side bracket for mounting to the frame subassembly, and the first gooseneck bracket, wherein the first gooseneck bracket interconnects the door-side bracket and the body-side bracket, wherein the first load path extends through the first reinforcing section of the first gooseneck bracket.
3. The vehicle tailgate assembly as recited in claim 1, wherein the second hinge assembly includes a three-piece dual pivot design that includes a door-side bracket for mounting to the door subassembly, a body-side bracket for mounting to the frame subassembly, and the second gooseneck bracket, wherein the second gooseneck bracket interconnects the door-side bracket and the body-side bracket, wherein the second load path extends through the second reinforcing section of the second gooseneck bracket.
4. The vehicle tailgate assembly as recited in claim 1, comprising a linkage bar that interconnects the first hinge assembly and the second hinge assembly.
5. A vehicle tailgate assembly, comprising:
a frame subassembly;
a door subassembly; and
a hinge system configured to movably support the door subassembly relative to the frame subassembly,
wherein the hinge system includes a first hinge assembly that establishes a first load path and a second hinge assembly that establishes a second load path that is configured differently than the first load path,

wherein the first load path extends through a first location of a first gooseneck bracket of the first hinge assembly, and the second load path extends through a second location of a second gooseneck bracket of the second hinge assembly,
wherein the first location is through an upper portion of the first gooseneck bracket, and the second location is through a lower portion of the second gooseneck bracket, and further comprising a first reinforcing section provided on the upper portion of the first gooseneck bracket at the first location, and further comprising a second reinforcing section provided on the lower portion of the second gooseneck bracket at the second location.
6. The vehicle tailgate assembly as recited in claim 5, wherein the first reinforcing section includes a different design configuration compared to the second reinforcing section.
7. The vehicle tailgate assembly as recited in claim 5, wherein the first reinforcing section extends along an arcuate path between a first barrel mount and a second barrel mount of the first gooseneck bracket, and the second reinforcing section extends along an arcuate path between a first barrel mount and a second barrel mount of the second gooseneck bracket.
8. The vehicle tailgate assembly as recited in claim 5, wherein the first gooseneck bracket is connected to a door-side bracket of the first hinge assembly by a first pivot pin and to a body-side bracket of the first hinge assembly by a second pivot pin.
9. The vehicle tailgate assembly as recited in claim 8, wherein the second gooseneck bracket is connected to a door-side bracket of the second hinge assembly by a first pivot pin and to a body-side bracket of the second hinge assembly by a second pivot pin.
10. A motor vehicle, comprising:
a cargo bed including a tailgate assembly having a frame subassembly, a door subassembly, and a hinge system configured to movably support the door subassembly relative to the frame subassembly, the hinge system including an upper hinge assembly and a lower hinge assembly;
wherein the upper hinge assembly includes a first gooseneck bracket having a first reinforcing section established by a first thickened section of the first gooseneck bracket, the first reinforcing section establishing a first load path of the hinge system,
wherein the lower hinge assembly includes a second gooseneck bracket having a second reinforcing section established by a second thickened section of the second gooseneck bracket, the second reinforcing section establishing a second load path of the hinge system.
11. The motor vehicle as recited in claim 10, wherein the first load path extends through an upper portion of a curved body of the first gooseneck bracket, and the second load path extends through a lower portion of a curved body of the second gooseneck bracket.
12. The motor vehicle as recited in claim 10, comprising a linkage bar that interconnects the upper hinge assembly and the lower hinge assembly, and wherein the linkage bar is accommodated within a first housing provided on the first gooseneck bracket of the upper hinge assembly and a second housing provided on the second gooseneck bracket of the lower hinge assembly.
13. The vehicle tailgate assembly as recited in claim 1, wherein the first thickened section is located in an upper portion of the first gooseneck bracket, and the second thickened section is located in a lower portion of the second gooseneck bracket.

14. The vehicle tailgate assembly as recited in claim 1, wherein the second reinforcing section is designed differently than the first reinforcing section such that the second load path is configured differently than the first load path.

15. The vehicle tailgate assembly as recited in claim 1, wherein the first reinforcing section extends along an arcuate path between a first barrel mount and a second barrel mount of the first gooseneck bracket, and the second reinforcing section extends along an arcuate path between a first barrel mount and a second barrel mount of the second gooseneck bracket.

16. The vehicle tailgate assembly as recited in claim 1, wherein the second thickened section has a greater thickness than the first thickened section.

17. The motor vehicle as recited in claim 10, wherein the first thickened section is located in an upper portion of the first gooseneck bracket, and the second thickened section is located in a lower portion of the second gooseneck bracket.

18. The motor vehicle as recited in claim 10, wherein the second reinforcing section is designed differently than the first reinforcing section such that the second load path is configured differently than the first load path.

19. The motor vehicle as recited in claim 10, wherein the first reinforcing section extends along an arcuate path between a first barrel mount and a second barrel mount of the first gooseneck bracket, and wherein the second reinforcing section extends along an arcuate path between a first barrel mount and a second barrel mount of the second gooseneck bracket.

20. The motor vehicle as recited in claim 10, wherein the second thickened section has a greater thickness than the first thickened section.

* * * * *